United States Patent
Perry et al.

(10) Patent No.: US 6,701,901 B2
(45) Date of Patent: *Mar. 9, 2004

(54) CONNECTION BETWEEN AN INTEGRATED PRESSURE MANAGEMENT APPARATUS AND A VAPOR COLLECTION CANISTER

(75) Inventors: Paul D. Perry, Chatham (CA); John A. Gurd, Wallaceburg (CA)

(73) Assignee: Siemens Canada Limited (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/102,787

(22) Filed: Mar. 22, 2002

(65) Prior Publication Data

US 2002/0096150 A1 Jul. 25, 2002

Related U.S. Application Data

(62) Division of application No. 09/566,136, filed on May 5, 2000, now Pat. No. 6,474,313.
(60) Provisional application No. 60/166,404, filed on Nov. 19, 1999.

(51) Int. Cl.$^7$ .............................................. F02M 33/02
(52) U.S. Cl. .................... 123/519; 123/518; 137/493; 137/495
(58) Field of Search .................. 137/493, 494, 137/495, 493.9, 560; 251/65, 129.15, 148; 200/83 Q, 61.86; 123/516, 518, 519, 520

(56) References Cited

U.S. PATENT DOCUMENTS

| | | | | | |
|---|---|---|---|---|---|
| 5,116,257 A | * | 5/1992 | Szlaga | ................... | 137/493 X |
| 5,803,056 A | * | 9/1998 | Cook et al. | ................. | 123/520 |
| 6,474,313 B1 | * | 11/2002 | Perry et al. | ................. | 123/519 |

* cited by examiner

Primary Examiner—John Rivell

(57) ABSTRACT

An integrated pressure management system manages pressure and detects leaks in a fuel system. The integrated pressure management system also performs a leak diagnostic for the headspace in a fuel tank, a canister that collects volatile fuel vapors from the headspace, a purge valve, and all associated hoses and connections.

12 Claims, 3 Drawing Sheets

CONNECTION BETWEEN AN INTEGRATED PRESSURE MANAGEMENT APPARATUS AND A VAPOR COLLECTION CANISTER

This is a divisional application of application Ser. No. 09/566,136, filed on May 5, 2000, now U.S. Pat. No. 6,474,313, the disclosure of which is incorporated by reference in its entirety herein.

CROSS REFERENCE TO RELATED APPLICATIONS

This application claims the benefit of the earlier filing date of U.S. Provisional Application No. 60/166,404, filed Nov. 19, 1999, which is incorporated by reference herein in its entirety.

Field of Invention

The present invention relates to an integrated pressure management system that manages pressure and detects leaks in a fuel system. The present invention also relates to an integrated pressure management system that performs a leak diagnostic for the headspace in a fuel tank, a canister that collects volatile fuel vapors from the headspace, a purge valve, and all associated hoses.

BACKGROUND OF INVENTION

In a conventional pressure management system for a vehicle, fuel vapor that escapes from a fuel tank is stored in a canister. If there is a leak in the fuel tank, canister or any other component of the vapor handling system, some fuel vapor could exit through the leak to escape into the atmosphere instead of being stored in the canister. Thus, it is desirable to detect leaks.

In such conventional pressure management systems, excess fuel vapor accumulates immediately after engine shutdown, thereby creating a positive pressure in the fuel vapor management system. Thus, it is desirable to vent, or "blow-off," through the canister, this excess fuel vapor and to facilitate vacuum generation in the fuel vapor management system. Similarly, it is desirable to relieve positive pressure during tank refueling by allowing air to exit the tank at high flow rates. This is commonly referred to as onboard refueling vapor recovery (ORVR).

SUMMARY OF THE INVENTION

According to the present invention, a sensor or switch signals that a predetermined pressure exists. In particular, the sensor/switch signals that a predetermined vacuum exists. As it is used herein, "pressure" is measured relative to the ambient atmospheric pressure. Thus, positive pressure refers to pressure greater than the ambient atmospheric pressure and negative pressure, or "vacuum," refers to pressure less than the ambient atmospheric pressure.

The present invention is achieved by providing a volatile fuel vapor collection system. This system comprises an integrated pressure management apparatus, a collection canister in fluid communication with the integrated pressure management apparatus; and a connection establishing the fluid communication between the integrated pressure management apparatus and the collection canister. The integrated pressure management apparatus includes a housing defining an interior chamber, the housing including first and second ports communicating with the interior chamber; a pressure operable device separating the chamber into a first portion and a second portion, the first portion communicating with the first port, the second portion communicating with the second port, the pressure operable device permitting fluid communication between the first and second ports in a first configuration and preventing fluid communication between the first and second ports in a second configuration; and a signal chamber in fluid communication with the first portion of the interior chamber, the pressure operable device further separating the signal chamber from the second portion of the interior chamber.

The present invention is also achieved by a method of assembling a volatile fuel vapor collection system. The method comprises providing collection canister having a first one of a male and female members; providing an integrated pressure management apparatus having a second one of the male and female members; and matingly engaging the male and female members with respect to one another. The integrated pressure management apparatus has a pressure operable device separating an interior chamber into a first portion and a second portion, the first portion communicating with the collection canister, the second portion communicating with a vent, the pressure operable device permitting fluid communication between the collection chamber and the vent in a first configuration and preventing fluid communication between the collection chamber and the vent in a second configuration.

BRIEF DESCRIPTION OF THE DRAWINGS

The accompanying drawings, which are incorporated herein and constitute part of this specification, illustrate the present invention, and, together with the general description given above and the detailed description given below, serve to explain features of the invention. Like reference numerals are used to identify similar features.

DETAILED DESCRIPTION OF THE PREFERRED EMBODIMENT

Figure 1:
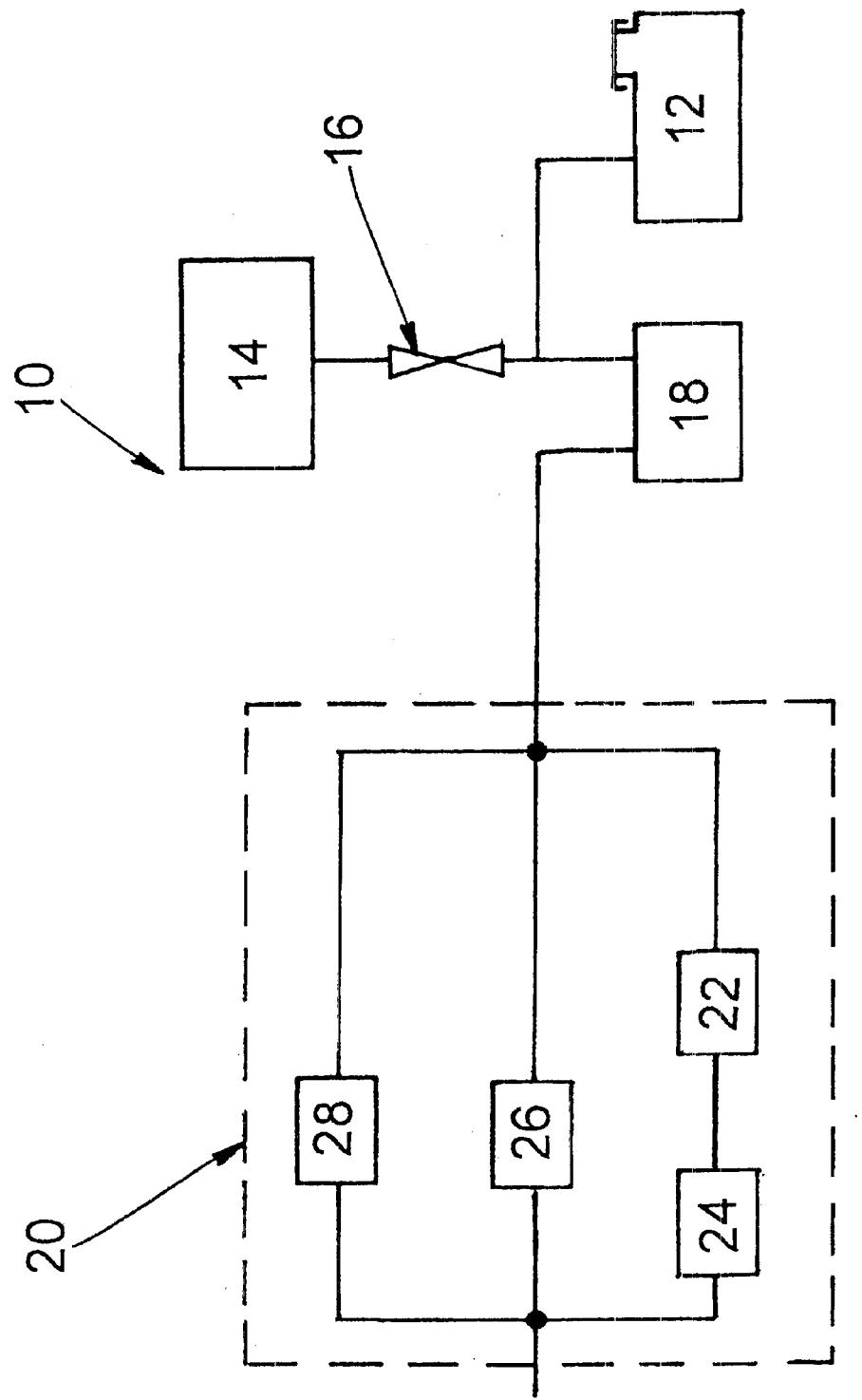
FIG. 1 is a schematic illustration showing the operation of an apparatus according to the present invention.

Referring to FIG. 1, a fuel system 10, e.g., for an engine (not shown), includes a fuel tank 12, a vacuum source 14 such as an intake manifold of the engine, a purge valve 16, a charcoal canister 18, and an integrated pressure management system (IPMA) 20.

The IPMA 20 performs a plurality of functions including signaling 22 that a first predetermined pressure (vacuum) level exists, relieving pressure 24 at a value below the first predetermined pressure level, relieving pressure 26 above a second pressure level, and controllably connecting 28 the charcoal canister 18 to the ambient atmospheric pressure A.

In the course of cooling that is experienced by the fuel system 10, e.g., after the engine is turned off, a vacuum is created in the tank 12 and charcoal canister 18. The existence of a vacuum at the first predetermined pressure level indicates that the integrity of the fuel system 10 is satisfactory. Thus, signaling 22 is used for indicating the integrity of the fuel system 10, i.e., that there are no leaks. Subsequently relieving pressure 24 at a pressure level below the first predetermined pressure level protects the integrity of the fuel tank 12, i.e., prevents it from collapsing due to vacuum in the fuel system 10. Relieving pressure 24 also prevents "dirty" air from being drawn into the tank 12.

Immediately after the engine is turned off, relieving pressure 26 allows excess pressure due to fuel vaporization to blow off, thereby facilitating the desired vacuum generation that occurs during cooling. During blow off, air within the fuel system 10 is released while fuel molecules are retained. Similarly, in the course of refueling the fuel tank 12, relieving pressure 26 allows air to exit the fuel tank 12 at high flow.

While the engine is turned on, controllably connecting 28 the canister 18 to the ambient air A allows confirmation of the purge flow and allows confirmation of the signaling 22 performance. While the engine is turned off, controllably connecting 28 allows a computer for the engine to monitor the vacuum generated during cooling.

Figure 2:
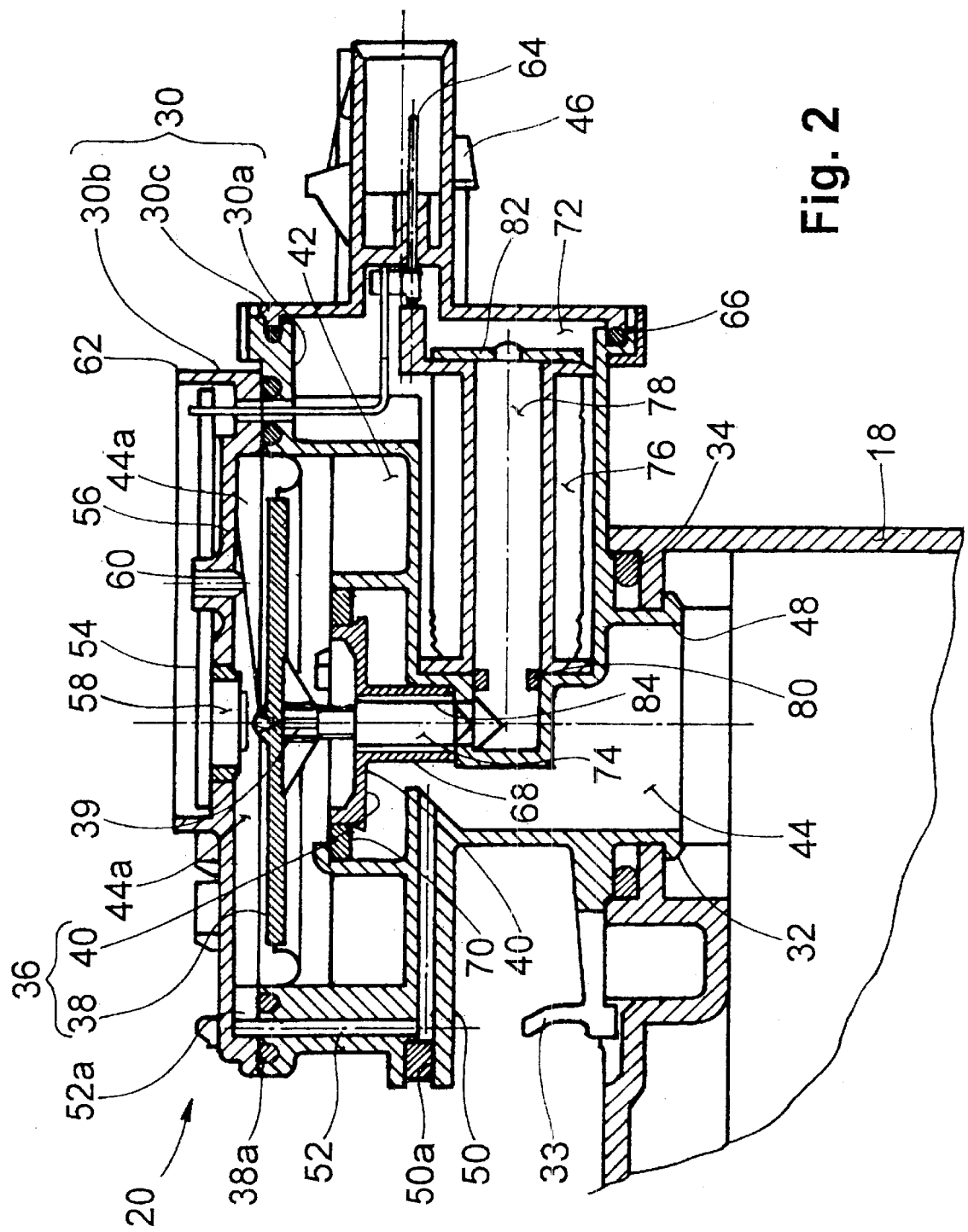
FIG. 2 is a cross-sectional view of a first embodiment of the apparatus according to the present invention

FIG. 2, shows a first embodiment of the IPMA 20 mounted on the charcoal canister 18. The IPMA 20 includes a housing 30 that can be mounted to the body of the charcoal canister 18 by a "bayonet" style attachment 32. A seal 34 is interposed between the charcoal canister 18 and the IPMA 20. This attachment 32, in combination with a snap finger 33, allows the IPMA 20 to be readily serviced in the field. Of course, different styles of attachments between the IPMA 20 and the body 18 can be substituted for the illustrated bayonet attachment 32, e.g., a threaded attachment, an interlocking telescopic attachment, etc. Alternatively, the body 18 and the housing 30 can be integrally formed from a common homogenous material, can be permanently bonded together (e.g., using an adhesive), or the body 18 and the housing 30 can be interconnected via an intermediate member such as a pipe or a flexible hose.

The housing 30 can be an assembly of a main housing piece 30a and housing piece covers 30b and 30c. Although two housing piece covers 30b,30c have been illustrated, it is desirable to minimize the number of housing pieces to reduce the number of potential leak points, i.e., between housing pieces, which must be sealed. Minimizing the number of housing piece covers depends largely on the fluid flow path configuration through the main housing piece 30a and the manufacturing efficiency of incorporating the necessary components of the IPMA 20 via the ports of the flow path. Additional features of the housing 30 and the incorporation of components therein will be further described below.

Signaling 22 occurs when vacuum at the first predetermined pressure level is present in the charcoal canister 18. A pressure operable device 36 separates an interior chamber in the housing 30. The pressure operable device 36, which includes a diaphragm 38 that is operatively interconnected to a valve 40, separates the interior chamber of the housing 30 into an upper portion 42 and a lower portion 44. The upper portion 42 is in fluid communication with the ambient atmospheric pressure through a first port 46. The lower portion 44 is in fluid communication with a second port 48 between housing 30 the charcoal canister 18. The lower portion 44 is also in fluid communicating with a separate portion 44a via first and second signal passageways 50,52. Orienting the opening of the first signal passageway toward the charcoal canister 18 yields unexpected advantages in providing fluid communication between the portions 44,44a. Sealing between the housing pieces 30a,30b for the second signal passageway 52 can be provided by a protrusion 38a of the diaphragm 38 that is penetrated by the second signal passageway 52. A branch 52a provides fluid communication, over the seal bead of the diaphragm 38, with the separate portion 44a. A rubber plug 50a is installed after the housing portion 30a is molded. The force created as a result of vacuum in the separate portion 44a causes the diaphragm 38 to be displaced toward the housing part 30b. This displacement is opposed by a resilient element 54, e.g., a leaf spring. The bias of the resilient element 54 can be adjusted by a calibrating screw 56 such that a desired level of vacuum, e.g., one inch of water, will depress a switch 58 that can be mounted on a printed circuit board 60. In turn, the printed circuit board is electrically connected via an intermediate lead frame 62 to an outlet terminal 64 supported by the housing part 30c. An O-ring 66 seals the housing part 30c with respect to the housing part 30a. As vacuum is released, i.e., the pressure in the portions 44,44a rises, the resilient element 54 pushes the diaphragm 38 away from the switch 58, whereby the switch 58 resets.

Pressure relieving 24 occurs as vacuum in the portions 44,44a increases, i.e., the pressure decreases below the calibration level for actuating the switch 58. Vacuum in the charcoal canister 18 and the lower portion 44 will continually act on the valve 40 inasmuch as the upper portion 42 is always at or near the ambient atmospheric pressure A. At some value of vacuum below the first predetermined level, e.g., six inches of water, this vacuum will overcome the opposing force of a second resilient element 68 and displace the valve 40 away from a lip seal 70. This displacement will open the valve 40 from its closed configuration, thus allowing ambient air to be drawn through the upper portion 42 into the lower the portion 44. That is to say, in an open configuration of the valve 40, the first and second ports 46,48 are in fluid communication. In this way, vacuum in the fuel system 10 can be regulated.

Controllably connecting 28 to similarly displace the valve 40 from its closed configuration to its open configuration can be provided by a solenoid 72. At rest, the second resilient element 68 displaces the valve 40 to its closed configuration. A ferrous armature 74, which can be fixed to the valve 40, can have a tapered tip that creates higher flux densities and therefore higher pull-in forces. A coil 76 surrounds a solid ferrous core 78 that is isolated from the charcoal canister 18 by an O-ring 80. The flux path is completed by a ferrous strap 82 that serves to focus the flux back towards the armature 74. When the coil 76 is energized, the resultant flux pulls the valve 40 toward the core 78. The armature 74 can be prevented from touching the core 78 by a tube 84 that sits inside the second resilient element 68, thereby preventing magnetic lock-up. Since very little electrical power is required for the solenoid 72 to maintain the valve 40 in its open configuration, the power can be reduced to as little as 10% of the original power by pulse-width modulation. When electrical power is removed from the coil 76, the second resilient element 68 pushes the armature 74 and the valve 40 to the normally closed configuration of the valve 40.

Relieving pressure 26 is provided when there is a positive pressure in the lower portion 44, e.g., when the tank 12 is being refueled. Specifically, the valve 40 is displaced to its open configuration to provide a very low restriction path for escaping air from the tank 12. When the charcoal canister 18, and hence the lower portions 44, experience positive pressure above ambient atmospheric pressure, the first and second signal passageways 50,52 communicate this positive pressure to the separate portion 44a. In turn, this positive pressure displaces the diaphragm 38 downward toward the valve 40. A diaphragm pin 39 transfers the displacement of the diaphragm 38 to the valve 40, thereby displacing the valve 40 to its open configuration with respect to the lip seal 70. Thus, pressure in the charcoal canister 18 due to refueling is allowed to escape through the lower portion 44, past the lip seal 70, through the upper portion 42, and through the second port 46.

Relieving pressure 26 is also useful for regulating the pressure in fuel tank 12 during any situation in which the engine is turned off. By limiting the amount of positive pressure in the fuel tank 12, the cool-down vacuum effect will take place sooner.

Figure 3:
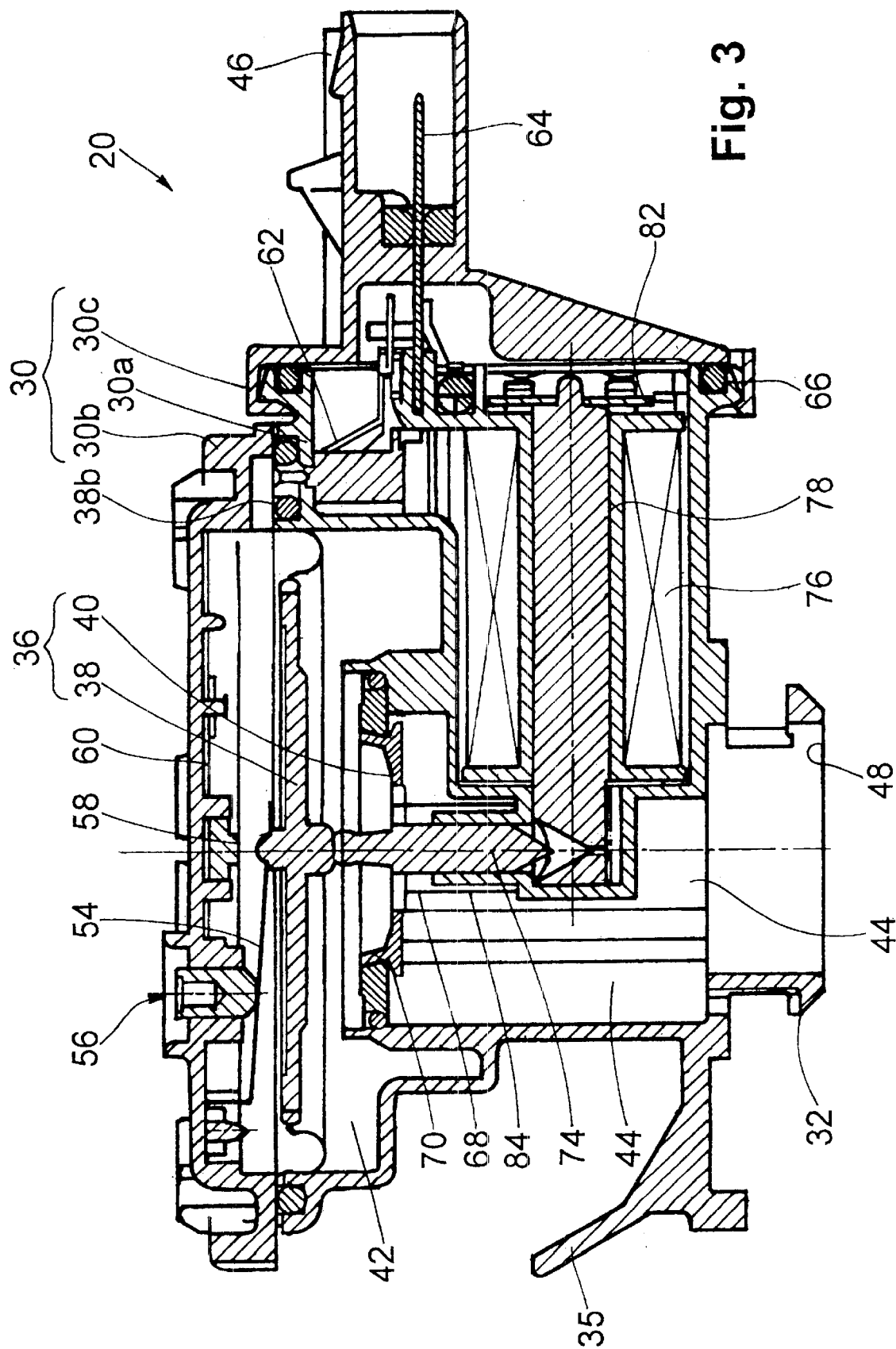
FIG. 3 is a cross-sectional view of a second embodiment of the apparatus according to the present invention.

FIG. 3 shows a second embodiment of the present invention that is substantially similar to the first embodiment shown in FIG. 2, except that the first and second signal passageways 50,52 have been eliminated, and the intermediate lead frame 62 penetrates a protrusion 38b of the diaphragm 38, similar to the penetration of protrusion 38a by the second signal passageway 52, as shown in FIG. 2. The signal from the lower portion 44 is communicated to the separate portion 44a via a path that extends through spaces between the solenoid 72 and the housing 30, through spaces between the intermediate lead frame 62 and the housing 30, and through the penetration in the protrusion 38b.

The present invention has many advantages, including:

providing relief for positive pressure above a first predetermined pressure value, and providing relief for vacuum below a second predetermined pressure value.

vacuum monitoring with the present invention in its open configuration during natural cooling, e.g., after the engine is turned off, provides a leak detection diagnostic.

driving the present invention into its open configuration while the engine is on confirms purge flow and switch/sensor function.

vacuum relief provides fail-safe operation of the purge flow system in the event that the solenoid fails with the valve in a closed configuration.

integrally packaging the sensor/switch, the valve, and the solenoid in a single unit reduces the number of electrical connectors and improves system integrity since there are fewer leak points, i.e., possible openings in the system.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A method of assembling a volatile fuel vapor collection system, comprising:
   providing a collection canister having a first one of a male and female members;
   providing an integrated pressure management apparatus having a second one of the male and female members, the integrated pressure management apparatus also having a pressure operable device separating an interior chamber into a first portion and a second portion, the first portion communicating with the collection canister, the second portion communicating with a vent, the pressure operable device permitting fluid communication between the collection canister and the vent in a first configuration and preventing fluid communication between the collection canister and the vent in a second configuration; and
   matingly engaging the male and female members with respect to one another, the matingly engaging includes a combination of longitudinally displacing and twisting the male member relative to the female member.

2. The method according to claim 1, wherein the male and female members comprise a bayonet style attachment.

3. A method of assembling a volatile fuel vapor collection system, comprising:
   providing a collection canister having a first one of a male and female members;
   providing an integrated pressure management apparatus having a second one of the male and female members, the integrated pressure management apparatus also having a pressure operable device separating an interior chamber into a first portion and a second portion, the first portion communicating with the collection canister, the second portion communicating with a vent, the pressure operable device permitting fluid communication between the collection canister and the vent in a first configuration and preventing fluid communication between the collection canister and the vent in a second configuration; and
   matingly engaging the male and female members with respect to one another, the matingly engaging includes rotating the male member relative to the female member.

4. A method of assembling a volatile fuel vapor collection system, comprising:
   providing a collection canister having a first one of a male and female members;
   providing an integrated pressure management apparatus having a second one of the male and female members, the integrated pressure management apparatus also having a pressure operable device separating an interior chamber into a first portion and a second portion, the first portion communicating with the collection canister, the second portion communicating with a vent, the pressure operable device permitting fluid communication between the collection canister and the vent in a first configuration and preventing fluid communication between the collection canister and the vent in a second configuration; and
   matingly engaging the male and female members with respect to one another, the matingly engaging includes integrally forming the male and female members from a homogeneous material.

5. The method according to claim 4, wherein the integrally forming comprises minimizing a dimension of the male and female members.

6. The method according to claim 4, wherein the integrally forming comprises eliminating a leak point between the male and female members.

7. A method of assembling a volatile fuel vapor collection system, comprising:
   providing a collection canister having a first one of a male and female members;
   providing an integrated pressure management apparatus having a second one of the male and female members, the integrated pressure management apparatus also having a pressure operable device separating an interior chamber into a first portion and a second portion, the first portion communicating with the collection canister, the second portion communicating with a vent, the pressure operable device permitting fluid communication between the collection canister and the vent in a first configuration and preventing fluid communication between the collection canister and the vent in a second configuration;
   matingly engaging the male and female members with respect to one another, the matingly engaging includes a combination of longitudinally displacing and twisting the male member relative to the female member; and locking the male member relative to the female member.

8. The method according to claim 7, wherein the locking comprises preventing disengaging the male and female members.

9. The method according to claim 7, wherein the locking comprises providing a resilient projection preventing relative rotation of the male and female members.

10. A method of assembling a volatile fuel vapor collection system, comprising:

providing a collection canister having a first one of a male and female members;

providing an integrated pressure management apparatus having a second one of the male and female members, the integrated pressure management apparatus also having a pressure operable device separating an interior chamber into a first portion and a second portion, the first portion communicating with the collection canister, the second portion communicating with a vent, the pressure operable device permitting fluid communication between the collection canister and the vent in a first configuration and preventing fluid communication between the collection canister and the vent in a second configuration;

matingly engaging the male and female members with respect to one another, the matingly engaging includes rotating the male member relative to the female member; and locking the male member relative to the female member.

11. The method according to claim 10, wherein the locking comprises preventing disengaging the male and female members.

12. The method according to claim 10, wherein the locking comprises providing a resilient projection preventing relative rotation of the male and female members.

* * * * *